US011922659B2

United States Patent
Yamashita

(10) Patent No.: US 11,922,659 B2
(45) Date of Patent: Mar. 5, 2024

(54) COORDINATE CALCULATION APPARATUS, COORDINATE CALCULATION METHOD, AND COMPUTER-READABLE RECORDING MEDIUM

(71) Applicant: NEC Solution Innovators, Ltd., Tokyo (JP)

(72) Inventor: Yoshihiro Yamashita, Tokyo (JP)

(73) Assignee: NEC Solution Innovators, Ltd., Tokyo (JP)

( * ) Notice: Subject to any disclaimer, the term of this patent is extended or adjusted under 35 U.S.C. 154(b) by 481 days.

(21) Appl. No.: 17/295,956

(22) PCT Filed: Nov. 27, 2019

(86) PCT No.: PCT/JP2019/046420
§ 371 (c)(1),
(2) Date: May 21, 2021

(87) PCT Pub. No.: WO2020/111139
PCT Pub. Date: Jun. 4, 2020

(65) Prior Publication Data
US 2022/0005223 A1 Jan. 6, 2022

(30) Foreign Application Priority Data

Nov. 29, 2018 (JP) ................. 2018-224015

(51) Int. Cl.
*G06T 7/73* (2017.01)
*G06T 17/00* (2006.01)
*G06V 10/46* (2022.01)

(52) U.S. Cl.
CPC ................ *G06T 7/75* (2017.01); *G06T 17/00* (2013.01); *G06V 10/462* (2022.01); *G06T 2207/10028* (2013.01)

(58) Field of Classification Search
CPC ..... G09B 29/12; G06T 7/521; G01B 11/2327; G03B 37/02; H04N 13/207
See application file for complete search history.

(56) References Cited

U.S. PATENT DOCUMENTS 7,187,809 B2 * 3/2007 Zhao .................... G06V 20/653
  382/285
7,280,685 B2 * 10/2007 Beardsley ............ G06V 10/267
  382/154

(Continued)

FOREIGN PATENT DOCUMENTS

CN          105190229 A    12/2015
JP          2003-006618 A   1/2003

(Continued)

OTHER PUBLICATIONS

Chinese Office Action for CN Application No. 201980078773.2, dated Oct. 8, 2022 with English Translation.

(Continued)

*Primary Examiner* — Yosef Kassa
(74) *Attorney, Agent, or Firm* — Sughrue Mion, PLLC

(57) ABSTRACT

A coordinate calculation apparatus 10 includes: an image selection unit 11 configured to select, when a specific portion is designated in an object, two or more images including the specific portion from the images of the object; a three-dimensional coordinate calculation unit 12 configured to specify, for each of the selected images, a location of points corresponding to each other at the specific portion, and calculating a three-dimensional coordinate of the specific portion by using the location of the point specified for each of the images and the camera matrix calculated in advance for each of the images; a three-dimensional model display unit 13 configured to display, using the point cloud data of the object, a three-dimensional model of the object on a (Continued)

screen, and displaying the designated specific portion on the three-dimensional model based on the calculated three-dimensional coordinates.

12 Claims, 15 Drawing Sheets

(56) References Cited

U.S. PATENT DOCUMENTS

| | | | | |
|---|---|---|---|---|
| 7,462,368 | B2* | 12/2008 | Bhandarkar | A61K 31/00 562/7 |
| 7,697,125 | B2* | 4/2010 | Swenson | G02B 19/0028 356/141.5 |
| 8,224,097 | B2* | 7/2012 | Matei | G06T 7/11 382/204 |
| 8,571,265 | B2* | 10/2013 | Takiguchi | G06T 7/521 382/104 |
| 8,665,263 | B2* | 3/2014 | Yoshida | G09B 29/12 345/419 |
| 2010/0034426 | A1 | 2/2010 | Takiguchi et al. | |
| 2015/0103148 | A1 | 4/2015 | Masuda | |
| 2016/0042523 | A1 | 2/2016 | Unten et al. | |
| 2016/0093058 | A1 | 3/2016 | Moteki et al. | |
| 2017/0345184 | A1 | 11/2017 | Tsubota et al. | |
| 2018/0293725 | A1 | 10/2018 | Ohshima | |

FOREIGN PATENT DOCUMENTS

| | | |
|---|---|---|
| JP | 2008/131176 A | 6/2008 |
| JP | 2009-075117 A | 4/2009 |
| JP | 2016-121917 A | 7/2016 |
| WO | 2014/002849 A | 1/2014 |
| WO | 2014-171418 A1 | 10/2014 |
| WO | 2017-103982 A1 | 6/2017 |

OTHER PUBLICATIONS

English translation of Written opinion for PCT Application No. PCT/JP2019/046420, dated Mar. 3, 2020.
International Search Report for PCT Application No. PCT/JP2019/046420, dated Mar. 3, 2020.

* cited by examiner

IMAGE A

IMAGE B

COORDINATE CALCULATION APPARATUS, COORDINATE CALCULATION METHOD, AND COMPUTER-READABLE RECORDING MEDIUM

This application is a National Stage Entry of PCT/JP2019/046420 filed on Nov. 27, 2019, which claims priority from Japanese Patent Application 2018-224015 filed on Nov. 29, 2018, the contents of all of which are incorporated herein by reference, in their entirety.

TECHNICAL FIELD

The present invention relates to a coordinate calculation apparatus and a coordinate calculation method for calculating the coordinates of a specific portion of an object on point cloud data, and further, a computer-readable recording medium in which a program for realizing these is recorded. Regarding.

BACKGROUND ART

In recent years, defects appearing in the appearance of structures such as bridges have been detected from images of structures. For example, Patent Document 1 discloses an apparatus for detecting defects such as fine cracks generated on the surface of a structure from an image of the structure taken by a camera.

Specifically, the apparatus disclosed in Patent Document 1 performs image analysis on an image taken by a camera, detects the defects generated on the surface of a structure, and then measures the distance to the defects by using a range finder. Subsequently, the apparatus disclosed in Patent Document 1 calculates the coordinates of the detected defects in the global coordinate system using the coordinate data associated with the image and the measured distance.

Therefore, according to the apparatus disclosed in Patent Document 1, defects generated on the surface of the structure can be detected from the image of the structure, and the coordinates of the defects in the global coordinate system can be calculated. Therefore, the manager of the structure can grasp the location of the defects.

LIST OF RELATED ART DOCUMENTS

Patent Document

Patent Document 1: International Publication No. 2017/103982

SUMMARY OF INVENTION

Problems to be Solved by the Invention

However, the location of the defect is only indicated by the coordinates, that is, by the numerical value, and the coordinate axis is not added to the actual structure, therefore, it is not easy for the manager to specify the actual location of the defect is determined.

An example of an object of the present invention is to provide coordinate calculation apparatus, coordinate calculation method, and computer-readable recording medium which can solve the above problem and specify a location of a specific portion on a three-dimensional model from a two-dimensional image showing the specific portion of an object.

Means for Solving the Problems

In order to achieve the above object, the first coordinate calculation apparatus in one aspect of the present invention includes:

an image selection unit configured to select, when a specific portion is designated in an object, two or more images including the specific portion from the images of the object, a three-dimensional coordinate calculation unit configured to specify, for each of the selected images, a location of points corresponding to each other at the specific portion, and calculating a three-dimensional coordinate of the specific portion by using the location of the point specified for each of the images and the camera matrix calculated in advance for each of the images, a three-dimensional model display unit configured to display, using the point cloud data of the object, a three-dimensional model of the object on a screen, and displaying the designated specific portion on the three-dimensional model based on the calculated three-dimensional coordinates.

In order to achieve the above object, the second coordinate calculation apparatus in one aspect of the present invention includes:

a feature point extraction unit configured to extract, when a specific portion is designated in an object, a feature point included in two or more images and related to the designated specific portion from a plurality of images including the object, a three-dimensional coordinate calculation unit configured to obtain the three-dimensional coordinates of the extracted feature points by using a point cloud data of the object constructed by using the plurality of images, and set the obtained three-dimensional coordinates as the three-dimensional coordinates of the designated specific portion, a three-dimensional model display unit configured to display, using the point cloud data of the object, a three-dimensional model of the object on a screen, and display the designated specific portion on the three-dimensional model based on the calculated three-dimensional coordinates.

In order to achieve the above object, the first coordinate calculation method in one aspect of the present invention includes:

(a) a step of selecting, when a specific portion is designated in an object, two or more images including the specific portion from the images of the object, (b) a step of specifying, for each of the selected images, a location of points corresponding to each other at the specific portion, and calculating a three-dimensional coordinate of the specific portion by using the location of the point specified for each of the images and the camera matrix calculated in advance for each of the images, (c) a step of displaying, using the point cloud data of the object, a three-dimensional model of the object on the screen, and displaying the designated specific portion on the three-dimensional model based on the calculated three-dimensional coordinates.

In order to achieve the above object, the second coordinate calculation method in one aspect of the present invention includes:

(a) a step of extracting, when a specific portion is designated in an object, a feature point included in two or more images and related to the designated specific portion from a plurality of images including the object, (b) a step of obtaining, the three-dimensional coordinates of the extracted feature points by using a point cloud data of the object constructed by using the plurality of images, setting the obtained three-dimensional coordinates as the three-dimensional coordinates of the designated specific portion, (c) a step of displaying, using the point cloud data of the object, a three-dimensional model of the object on the screen, and displaying the designated specific portion the three-dimensional model based on the calculated three-dimensional coordinates.

In order to achieve the above object, the first computer-readable recording medium in one aspect of the present invention is a computer readable recording medium that includes recorded thereon a program, the program including instructions that cause the computer to carry out:

(a) a step of selecting, when a specific portion is designated in an object, two or more images including the specific portion from the images of the object, (b) a step of specifying, for each of the selected images, a location of points corresponding to each other at the specific portion, and calculating a three-dimensional coordinate of the specific portion by using the location of the point specified for each of the images and the camera matrix calculated in advance for each of the images, (c) a step of displaying, using the point cloud data of the object, a three-dimensional model of the object on the screen, and displaying the designated specific portion the three-dimensional model based on the calculated three-dimensional coordinates.

In order to achieve the above object, the second computer-readable recording medium in one aspect of the present invention is a computer readable recording medium that includes recorded thereon a program, the program including instructions that cause the computer to carry out:

(a) a step of extracting, when a specific portion is designated in an object, a feature point included in two or more images and related to the designated specific portion from a plurality of images including the object, (b) a step of obtaining, the three-dimensional coordinates of the extracted feature points by using a point cloud data of the object constructed by using the plurality of images, setting the obtained three-dimensional coordinates as the three-dimensional coordinates of the designated specific portion, (c) a step of displaying, using the point cloud data of the object, a three-dimensional model of the object on the screen, and displaying the designated specific portion the three-dimensional model based on the calculated three-dimensional coordinates.

Advantageous Effects of the Invention

As described above, according to the present invention, a location of a defective portion or the like on the three-dimensional model can be specified from the two-dimensional image showing the defective portion or the like.

Example Embodiment

First Example Embodiment

In the following, a coordinate calculation apparatus, a coordinate calculation method, and a program in a first example embodiment of the invention will be described with reference to FIGS. 1 to 6.

[Apparatus Configuration]

Figure 1:
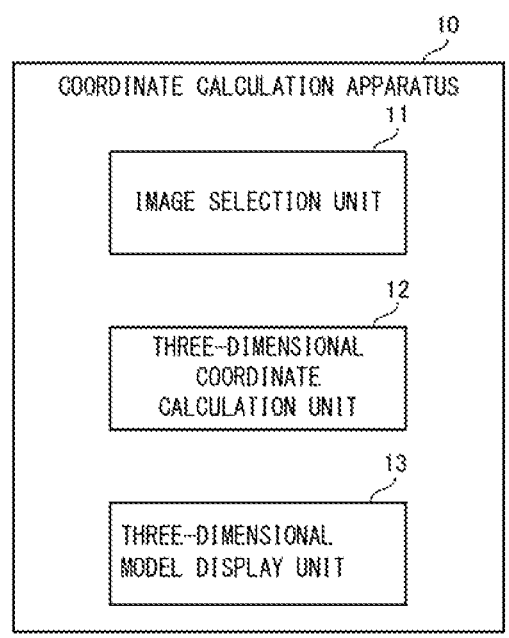
FIG. 1 is a block diagram illustrating a schematic configuration of a coordinate calculation apparatus according to a first example embodiment of the present invention.

First, a schematic configuration of the coordinate calculation apparatus in the first example embodiment will be described with reference to FIG. 1. FIG. 1 is a block diagram illustrating a schematic configuration of a coordinate calculation apparatus according to a first example embodiment of the present invention.

The coordinate calculation apparatus 10 according to the first example embodiment shown in FIG. 1 is an apparatus that calculates the location of a specific portion designated on an object and displays the calculated location on a three-dimensional model of the object. As shown in FIG. 1, the coordinate calculation apparatus 10 includes an image selection unit 11, a three-dimensional coordinate calculation unit 12, and a three-dimensional model display unit 13.

The image selection unit 11 selects, when the specific portion is designated in the object, two or more images including the specific portion from images (two-dimensional images) of the object. First, the three-dimensional coordinate calculation unit 12 specifies, for each of the selected images, a location of points corresponding to each other at the specific portion. Then, the three-dimensional coordinate calculation unit 12 calculates a three-dimensional coordinate of the specific portion by using the location of the point specified for each of the images and a camera matrix calculated in advance for each of the images.

The three-dimensional model display unit 13 displays, using a point cloud data of the object, the three-dimensional model of the object on a screen. And the three-dimensional model display unit 13 displays the designated specific portion the three-dimensional model based on the calculated three-dimensional coordinates.

The point cloud data of the object is data composed of a set of three-dimensional coordinates of feature points existing on the surface of the object. The point cloud data can be constructed by using each of the extracted feature points extracted from each of a plurality of images of the object 50.

As described above, in the first example embodiment, the three-dimensional coordinates of the specific portion are calculated from the plurality of images including the specific portion by using the camera matrix, and the specific portion is displayed on the three-dimensional model of the object based on the calculated three-dimensional coordinates. That is, according to the first example embodiment, it is possible to specify the location of the specific portion on the three-dimensional model from the two-dimensional image showing the specific portion of the object.

Figure 2:
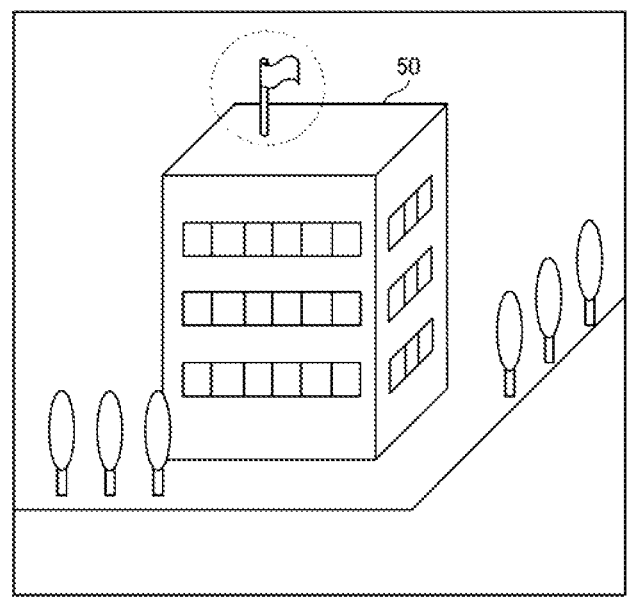
FIG. 2 is a perspective view illustrating an example of an object whose coordinates are to be calculated in the first example embodiment of the present invention.
Figure 3A:
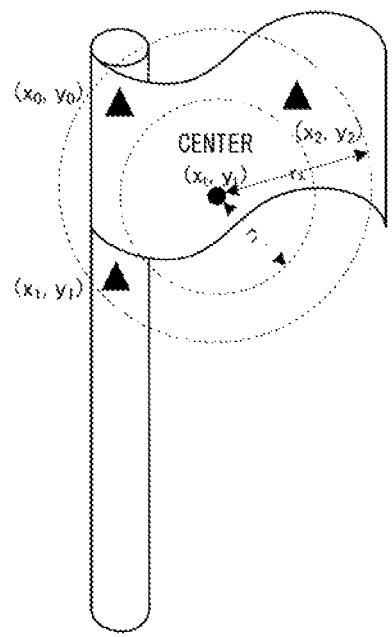
FIGS. 3A and 3B are explanatory views illustrating the processing performed by the three-dimensional coordinate calculation unit in the first example embodiment of the present invention, and each shows a series of processing.
Figure 3B:
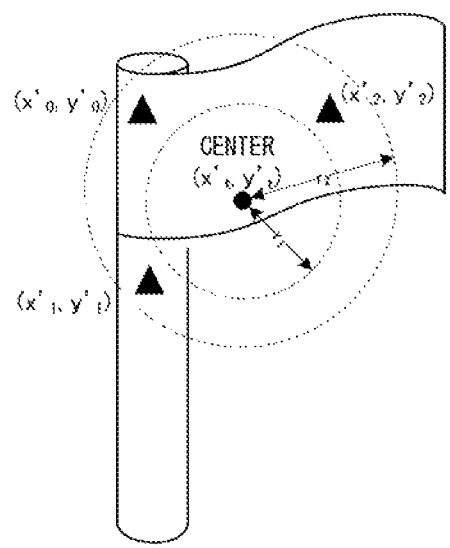
Figure 4:
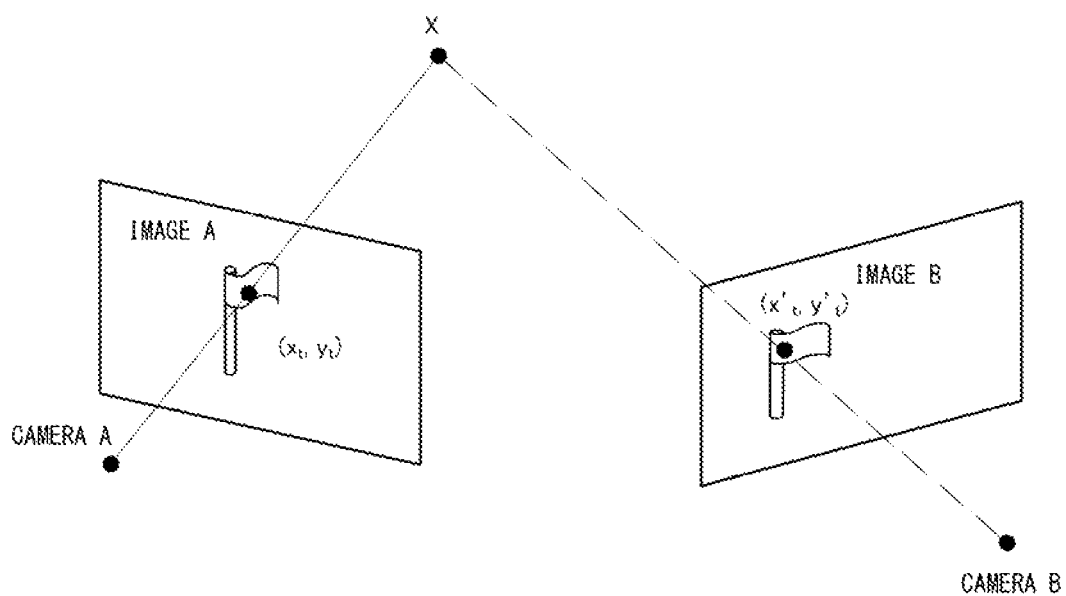
FIG. 4 is an explanatory diagram illustrating a process performed by the three-dimensional coordinate calculation unit after the process shown in FIGS. 3A and 3B.

Next, the configuration and functions of the coordinate calculation apparatus in the first example embodiment will be specifically described with reference to FIGS. 2 to 4. FIG. 2 is a perspective view illustrating an example of an object whose coordinates are to be calculated in the first example embodiment of the present invention. FIGS. 3A and 3B are explanatory views illustrating the processing performed by the three-dimensional coordinate calculation unit in the first example embodiment of the present invention, and each shows a series of processing. FIG. 4 is an explanatory diagram illustrating a process performed by the three-dimensional coordinate calculation unit after the process shown in FIGS. 3A and 3B.

As shown in FIG. 2, in the first example embodiment, the object 50 is a building. In the example of FIG. 2, an image of the object 50 is shown. In the first example embodiment, the image selection unit 11 acquires image data of a large number of images in which the object 50 is captured in advance. Then, the image selection unit 11 receives the input of the specific portion designated in the object 50 and selects the pair image including the received specific portion.

For example, it is assumed that the manager or the like of the object 50 displays an image of the object 50 on a screen of a terminal apparatus as shown in FIG. 2 and designates a specific portion on the displayed image. In this case, the terminal apparatus inputs the image data of the designated specific portion to the image selection unit 11. The specific portion designated in FIG. 2 is indicated by a broken line.

When the image data of the specified specific portion is input, the image selection unit 11 receives the input; specifies, for example, two images including the designated specific portion from a large number of images acquired in advance; and then selects the two specified images as a pair image.

The specific portion may be automatically designated by other apparatus. For example, other apparatus may learn the defective portion of the object 50 by machine learning and may input the learned defective portion as a specific portion to the image selection unit 11.

In the first example embodiment, when the pair image is selected, the three-dimensional coordinate calculation unit 12 performs the processes shown in FIGS. 3A to 3B to calculate the three-dimensional coordinate of the specific portion shown in the pair image. This will be described in detail below.

As shown in FIG. 3A, first, the three-dimensional coordinate calculation unit 12 specifies the coordinates $(x_t, y_t)$ of the center of the designated portion in one of the pair image, for example in image A; and further extracts three feature points in the annular region which is located in the range of $r_1$ to $r_2$ from the center. In FIG. 3A, the coordinates of each feature point extracted from the image A are $(x_0, y_0)$, $(x_1, y_1)$, and $(x_2, y_2)$, respectively. The number of feature points to be extracted is not limited to three.

Next, as shown in FIG. 3B, the three-dimensional coordinate calculation unit 12 extracts the feature points corresponding to the feature points extracted in the image A from the image B which is the other part of the pair image. In FIG. 3B, the coordinates of each feature point extracted from the image B are $(x'_0, y'_0)$, $(x'_1, y'_1)$, and $(x'_2, y'_2)$, respectively.

Then, the three-dimensional coordinate calculation unit 12 calculates a rotation matrix J ($J=(J_x, J_y, J_z)$) and the parallel progression matrix t ($t=(t_x, t_y, t_z)$) that satisfy the following equation 1, as correlation transformation matrixes for converting each feature point extracted from the image A into each feature point extracted from the image B. In addition, $i=0,1,2$.

$$(x'_i, y'_i) = J(x_i, y_i) + t \qquad \text{(Equation 1)}$$

Then, the three-dimensional coordinate calculation unit 12 multiplies the calculated rotation matrix R by the coordinates $(x_t, y_t)$ of the center of the specific portion in the image A according to the above equation 1, and adds the parallel matrix t to the obtained value. As a result, the coordinates $(x'_t, y'_t)$ of the center of the specific portion in the image B are calculated. In the present example embodiment, the coordinates of the center of the specific portion in the image B may be calculated by a method other than the above-mentioned calculation method.

In the above example, the three-dimensional coordinates of the center of the specific portion are extracted as the three-dimensional coordinates of the specific portion of each pair image, however the first example embodiment is not limited to this aspect. In the first example embodiment, the three-dimensional coordinates of points other than the center of the specific portion may be calculated.

Next, as shown in FIG. 4, the three-dimensional coordinate calculation unit 12 calculates the three-dimensional coordinates X of the center point of the specific portion by using the coordinates of the center point of the specific portion in the image A, the coordinates of the center point of the specific portion in the image B, and the camera matrix P calculated for the image A and the camera matrix P' calculated for the image B.

Specifically, the three-dimensional coordinate calculation unit 12 calculates the three-dimensional coordinate X by solving the following equation 2. Further, the matrix A in Equation 2 is represented by Equation 3. In Equation 3, the $p^{iT}$ is the row of the camera matrix P and the $p'^{iT}$ is the row of the camera matrix P'.

$$AX = 0 \quad \text{(Equation 2)}$$

$$A = \begin{bmatrix} xp3T & - & p1T \\ yp3T & - & p2T \\ x'p'3T & - & p'1T \\ y'p'3T & - & p'2T \end{bmatrix} \quad \text{(Equation 3)}$$

[Apparatus Operations]

Figure 5:
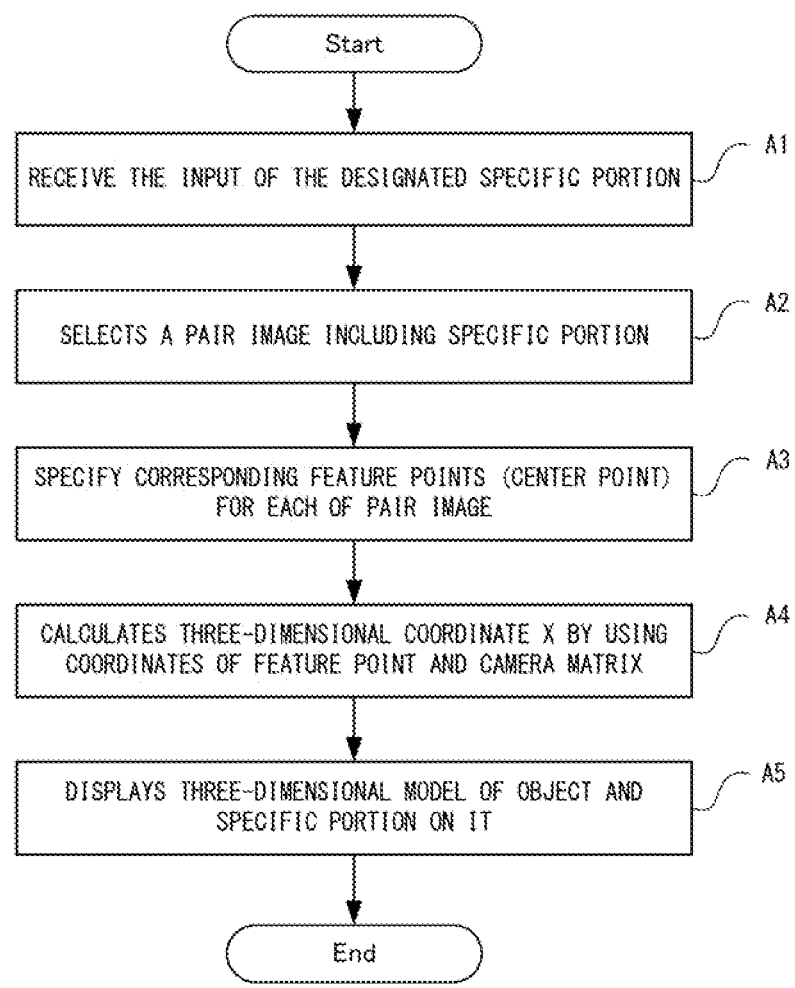
FIG. 5 is a flow chart illustrating the operation of the coordinate calculation apparatus according to the first example embodiment of the present invention.

Next, the operations of the coordinate calculation apparatus 10 in the first example embodiment will be described with reference to FIG. 5. FIG. 5 is a flow chart illustrating the operation of the coordinate calculation apparatus according to the first example embodiment of the present invention. FIGS. 1 to 5 will be referred to as needed in the following description. Furthermore, in the first example embodiment, a coordinate calculation method is implemented by causing the coordinate calculation apparatus to operate. Accordingly, the following description of the operations of the coordinate calculation apparatus is substituted for the description of the coordinate calculation method in the first example embodiment.

As shown in FIG. 5, first, when a specific portion is designated in the object 50, the image selection unit 11 receives the input of the designated specific portion (step A1).

Next, the image selection unit 11 selects a pair image including the specific portion for which the input is received in step A1 from a large number of images in which the object 50 is captured (step A2). The selected image is not limited to the pair and may be three or more. Further, in step A2, the image selection unit 11 inputs the image data of the selected image to the three-dimensional coordinate calculation unit 12.

Next, the three-dimensional coordinate calculation unit 12 specifies feature points corresponding to each other at specific portions for each of the pair image selected in step A2 (step A3). Specifically, in step A3, as shown in FIGS. 3A and 3B, the three-dimensional coordinate calculation unit 12 specifies coordinates $(x_t, y_t)$ of the center point of a specific portion in one of the pair image, and calculates coordinates $(x'_t, y'_t)$ of the center point of the specific portion on the other side of the pair image from these.

Next, the three-dimensional coordinate calculation unit 12 calculates the three-dimensional coordinate X of the center point of the specific portion by using the coordinates of the center point of the specific portion in each pair image and the camera matrix calculated for each pair image (step A4). Specifically, in step A4, the three-dimensional coordinate calculation unit 12 calculates the three-dimensional coordinate X by solving the above-mentioned equation 3.

Next, the three-dimensional model display unit 13 displays the three-dimensional model of the object 50 on the screen of the display apparatus or the like by using the point cloud data of the object 50, and further, displays a designated specific portion on the three-dimensional model based on the dimensional coordinates X calculated in step 4 (step A5).

Effect in First Example Embodiment

As described above, in the first example embodiment, the three-dimensional coordinates of the specific portion are calculated from a plurality of images showing the designated specific portion, and the calculated three-dimensional coordinates are displayed on the three-dimensional model of the object. Therefore, when the object is a structure and a portion where the defect has occurred is designated, the manager of the structure can easily grasp the location where the defect has occurred on the three-dimensional model of the structure.

[Program]

It suffices for the program in the first example embodiment to be a program that causes a computer to execute steps A1 to A5 illustrated in FIG. 5. By installing this program on a computer and executing the program, the coordinate calculation apparatus and the coordinate calculation apparatus method in the first example embodiment can be realized. In this case, the processor of the computer functions and performs processing as the image selection unit 11, the three-dimensional coordinate calculation unit 12, and the three-dimensional model display unit 13.

Also, the program in the present example embodiment may be executed by a computer system formed from a plurality of computers. In this case, the computers may each function as one of the image selection unit 11, the three-dimensional coordinate calculation unit 12, and the three-dimensional model display unit 13, for example.

Second Example Embodiment

Figure 6:
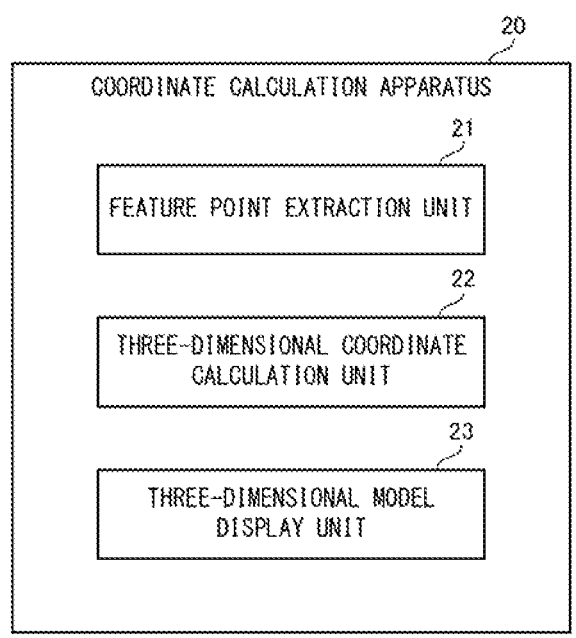
FIG. 6 is a block diagram illustrating a schematic configuration of a coordinate calculation apparatus according to a second example embodiment of the present invention.

First, a schematic configuration of the coordinate calculation apparatus in the second example embodiment will be described. FIG. 6 is a block diagram illustrating a schematic configuration of a coordinate calculation apparatus according to a second example embodiment of the present invention.

The coordinate calculation apparatus 20 according to the second example embodiment shown in FIG. 6 also calculates the location of a specific portion designated on the object, and displays the coordinated location on a three-dimensional model of the object, similarly to the coordinate calculation apparatus 10 according to the first example embodiment shown in FIG. 1. As shown in FIG. 6, the coordinate calculation apparatus 20 includes a feature point extraction unit 21, a three-dimensional coordinate calculation unit 22, and a three-dimensional model display unit 23.

When a specific portion is designated in the object, the feature point extraction unit 21 extracts feature points included in two or more images and related to the designated specific portion from a plurality of images including the object. The three-dimensional coordinate calculation unit 22 obtains the three-dimensional coordinates of the extracted feature points by using a point cloud data of the object constructed by using the plurality of images, and sets the obtained three-dimensional coordinates as the three-dimensional coordinates of the designated specific portion, The three-dimensional model display unit 23 has the same function as the three-dimensional model display unit 13 shown in FIG. 1. The three-dimensional model display unit 23 displays the three-dimensional model of the object on the screen of a display apparatus or other terminal apparatus by using the point cloud data of the object. Further, the three-dimensional model display unit 23 displays the designated specific portion on the three-dimensional model based on the calculated three-dimensional coordinates.

The point cloud data of the object is data composed of a set of three-dimensional coordinates of feature points existing on the surface of the object, as described in the first example embodiment.

As described above, in the second example embodiment, the three-dimensional coordinates of the specific portion are calculated by using the point cloud data of the object, and the specific portion is displayed on the three-dimensional model of the object based on the calculated three-dimensional coordinates. That is, also in the second example embodiment, similarly to the first example embodiment, it is possible to specify the location of the specific portion on the three-dimensional model from the two-dimensional image showing the specific portion of the object.

Figure 7:
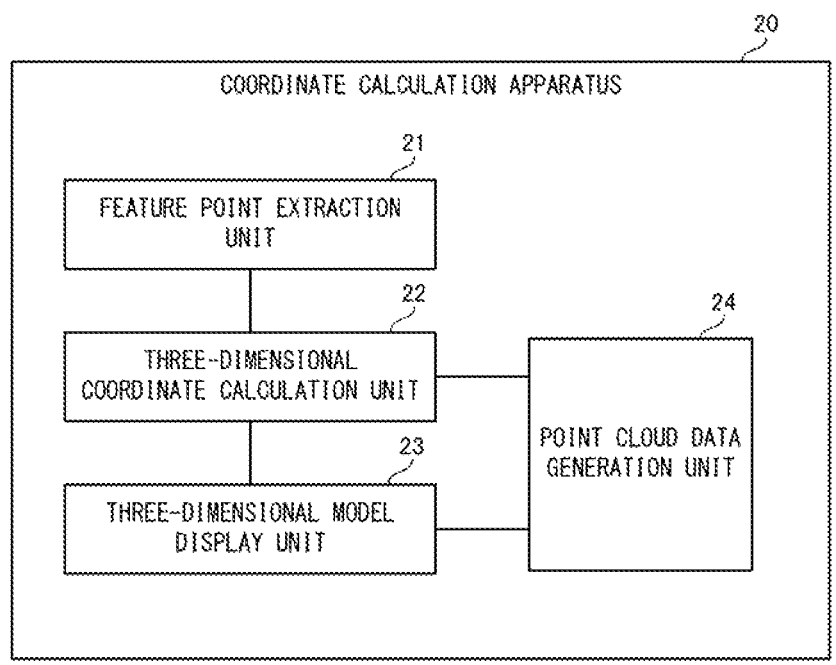
FIG. 7 is a block diagram specifically illustrating the configuration of the coordinate calculation apparatus according to the second example embodiment of the present invention.
Figure 8:
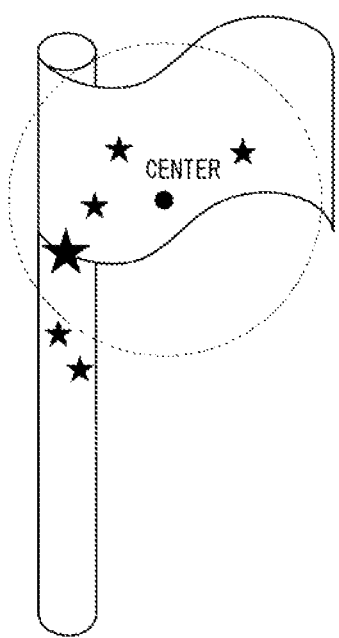
FIG. 8 is an explanatory diagram illustrating a process performed by a feature point extraction unit in the second example embodiment of the present invention.

Next, the configuration and function of the coordinate calculation apparatus 20 according to the second example embodiment will be described more specifically with reference to FIGS. 7 to 10. FIG. 7 is a block diagram specifically illustrating the configuration of the coordinate calculation apparatus according to the second example embodiment of the present invention. FIG. 8 is an explanatory diagram illustrating a process performed by the feature point extraction unit in the second example embodiment of the present invention.

First, also in the second example embodiment, it is assumed that the object is a building (see FIG. 2). Further, as shown in FIG. 7, the coordinate calculation apparatus 20 in the second example embodiment includes a point cloud data generation unit 24 for generating point cloud data of the object, in addition to the feature point specification unit 21, the three-dimensional coordinate calculation unit 22, and the three-dimensional model display unit 23 described above.

First, in case that, in each of a plurality of images including an object, feature points to corresponding to images other than the image are extracted, the point cloud data generation unit 24 selects a pair image from the images which the feature points are extracted. Next, the point cloud data generation unit 24, in each of the selected pair images, obtains a three-dimensional coordinate of a location of a camera that has taken the image and a rotation matrix from a camera matrix calculated in advance for the camera that has taken the image.

Next, the point cloud data generation unit 24 calculates the three-dimensional coordinates of a feature points corresponding to both of the selected pair image by using the three-dimensional coordinates of the camera location and the rotation matrix. Then, the point cloud data generation unit 24 generates point cloud data by using the feature points for which the three-dimensional coordinates are calculated.

In the second example embodiment, the feature point extraction unit 21 first receives an input of a specific portion designated by the object 50. Specifically, the feature point extraction unit 21 receives the input, when image data of a designated specific portion is input from a terminal apparatus or other external apparatus of the manager or the like, similarly to the image selection unit 11 in the first example embodiment.

Next, the feature point extraction unit 21 selects two or more images including the input specific portion from the plurality of images used for generating the point cloud data, and extracts feature points related to a specific portion from each of the two or more selected images. Specifically, for example, as shown in FIG. 8, the feature point extraction unit 21 extracts feature points having the maximum feature amount, which exists within a certain distance from the center point of the specific portion as a feature point related to the specific portion. The center point in this case is a basis for extracting a feature point, and the basis may be a point other than the center point.

In the second example embodiment, the three-dimensional coordinate calculation unit 22 compares the feature points extracted by the feature point extraction unit 21 and each feature point constituting the point cloud data generated by the point cloud data generation unit 24. Then, the three-dimensional coordinate calculation unit 22 specifies the feature points that match the feature points extracted by the feature point extraction unit 21 among the feature points constituting the point cloud data, and sets the three-dimensional coordinates of the specified feature points as the three-dimensional coordinates of the feature points extracted by the feature point extraction unit 21.

Next, the three-dimensional coordinate calculation unit 22 calculates the three-dimensional coordinates of the feature points extracted by the feature point extraction unit 21.

[Apparatus Operations]

Figure 9:
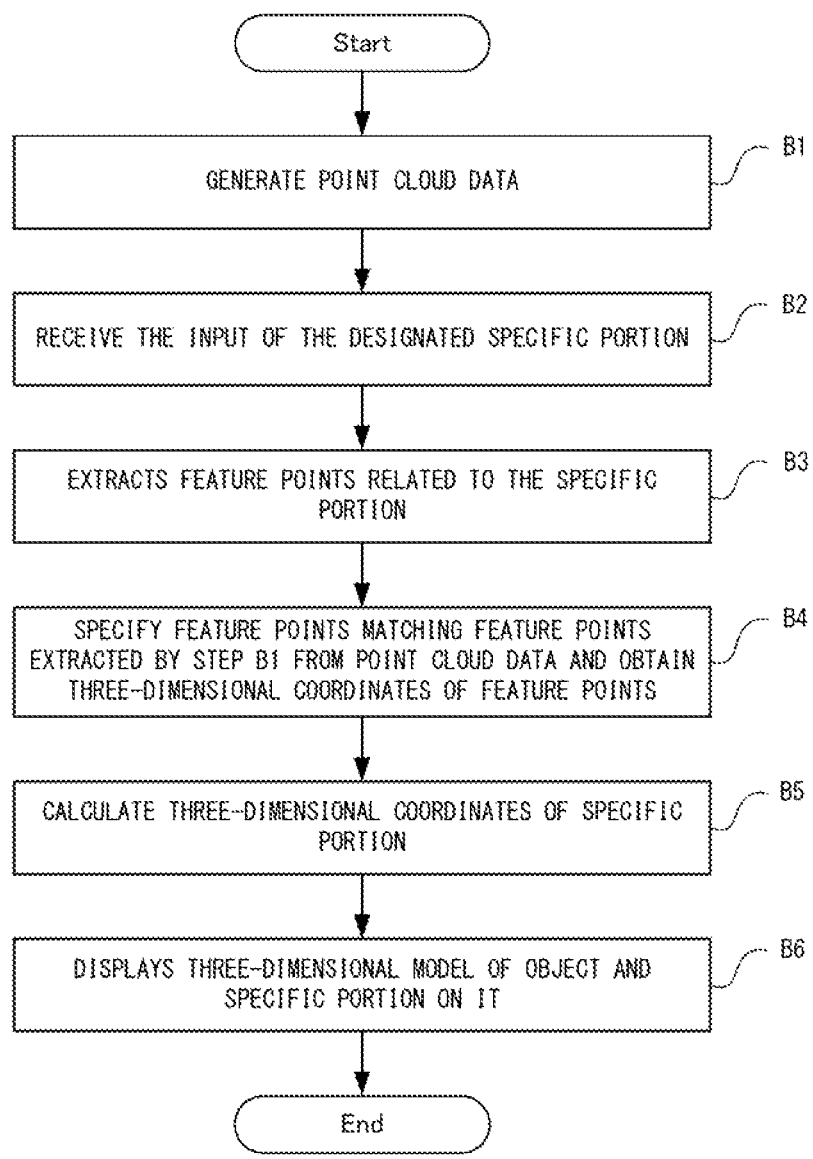
FIG. 9 is a flow chart illustrating the operation of the coordinate calculation apparatus according to the second example embodiment of the present invention.

Next, the operations of the coordinate calculation apparatus 20 in the second example embodiment will be described with reference to FIG. 9. FIG. 9 is a flow chart illustrating the operation of the coordinate calculation apparatus according to the second example embodiment of the present invention. In the following description, FIGS. 7 and 8 will be referred to as appropriate. Further, in the second example embodiment, the coordinate calculation method is performed by operating the coordinate calculation apparatus 20. Therefore, the description of the coordinate calculation method in the second example embodiment will be replaced with the following description of the operation of the coordinate calculation apparatus 20.

As shown in FIG. 9, first, the point cloud data generation unit 24 generates a point cloud data by using a plurality of images showing an object (step B1). The step B1 may be performed before step B2, which will be described later, and there may be a certain period between the time of execution of step B1 and the time of execution of step B2.

Next, when the specific portion is designated in the object 50, the feature point extraction unit 21 receives the input of the designated specific portion (step B2).

Next, the feature point extraction unit 21 selects two or more images including the input specific portion from the plurality of images used for generating the point cloud data, and extracts feature points related to the specific portion from each of the two or more selected images. (Step B3).

Next, the three-dimensional coordinate calculation unit 22 compares the feature points extracted in step B3 with each feature point constituting the point cloud data generated by the point cloud data generation unit 24. Then, the three-dimensional coordinate calculation unit 22 specifies the feature points that match the feature points extracted by the feature point extraction unit 21 among the feature points constituting the point cloud data, and sets the dimensional coordinates of the specified feature points as the three-dimensional coordinates of the feature points extracted in step B3 (step B4).

Then, since the three-dimensional coordinates obtained in step B4 are the three-dimensional coordinates of the feature points related to the specific portion, the three-dimensional coordinate calculation unit 22 extracts the three-dimensional coordinates obtained in step B4 as three-dimensional coordinates of the specific portion (step B5).

Next, the three-dimensional model display unit 23 displays the three-dimensional model of the object on the screen of the display apparatus or the like by using the point cloud data of the object 50, and further displays the designated specific portion on the three-dimensional model based on the coordinates calculated in step B5 (step B6).

Figure 10:
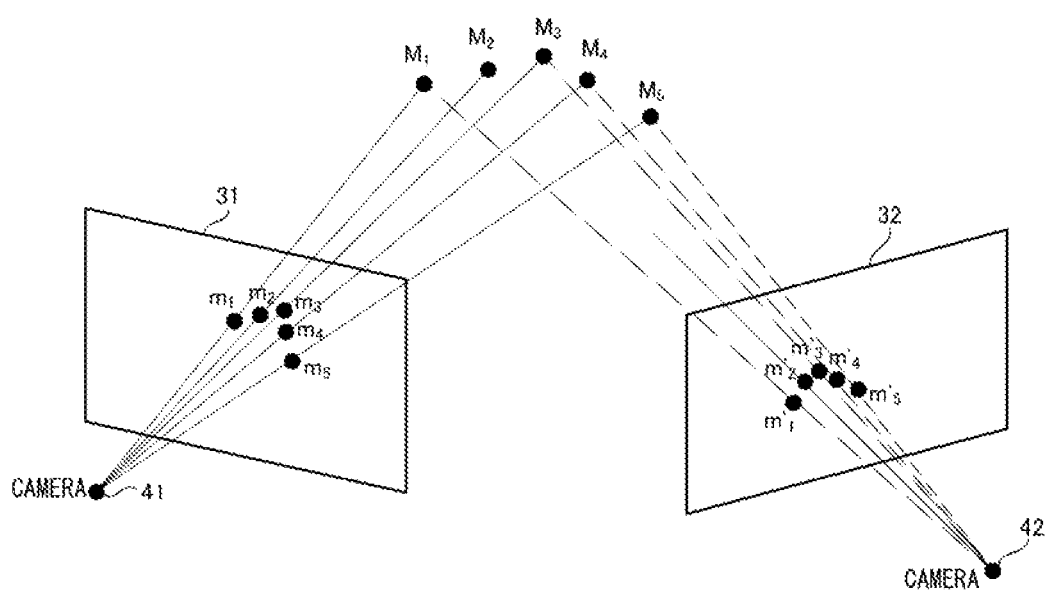
FIG. 10 is a diagram illustrating an example of a pair image selected for generating point cloud data.
Figure 11:
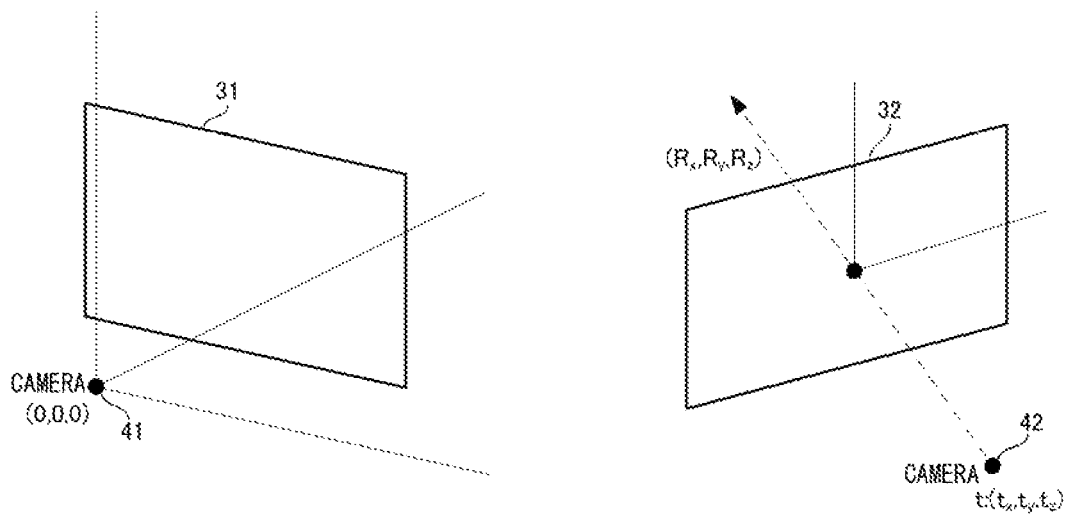
FIG. 11 is a diagram illustrating an example of a three-dimensional coordinates of a camera of the initial pair image and a rotation matrix obtained from a camera matrix.
Figure 12:
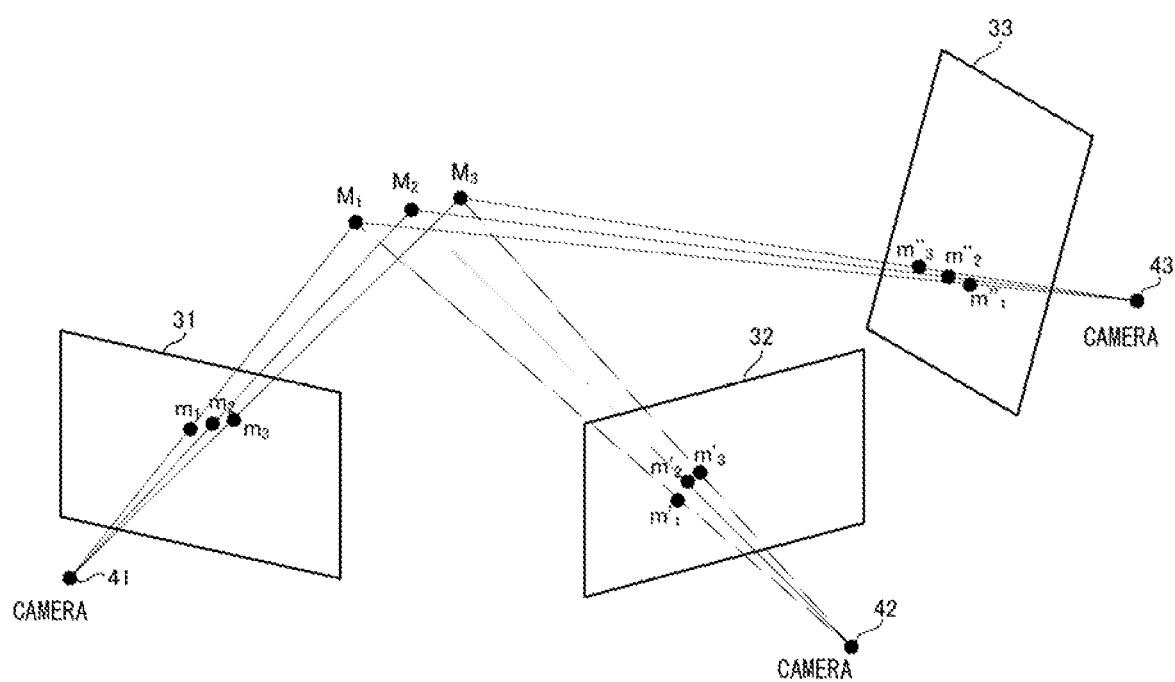
FIG. 12 is a diagram illustrating an example of a newly selected image after selection of an initial pair image and a pair of feature points extracted from the image.

Here, the point cloud data generation process (step B1) by the point cloud data generation unit 24 will be specifically described with reference to FIGS. 10 to 12. FIG. 10 is a diagram showing an example of a pair image selected for generating point cloud data. FIG. 11 is a diagram showing an example of a three-dimensional coordinates of a camera of an initial pair image and a rotation matrix obtained from a camera matrix. FIG. 12 is a diagram showing an example of a newly selected image after selection of an initial pair image and a pair of feature point extracted from the image.

As shown in FIG. 10, the point cloud data generation unit 24 selects the image 31 and the image 32 as the first pair image (initial pair image). In this case, the feature points ($m_1$ to $m_5$) extracted from the image 31 correspond to the feature points ($m'_1$ to $m'_5$) extracted from the image 32. $m_1$ and $m'_1$, $m_2$ and $m'_2$, $m_3$ and $m'_3$, $m_4$ and $m'_4$, and $m_5$ and $m'_5$ are pair feature point, respectively. Further, in the example of FIG. 10, the image 31 is taken by the camera 41, and the image 32 is taken by the camera 42. In FIGS. 3, M (M1 to M5) is three-dimensional coordinates on the object corresponding to each feature point.

Next, the point cloud data generation unit 24 uses the pair feature point ($m_1$ to $m_5$, $m'_1$ to $m'_5$) extracted from each of the initial pair images to calculate camera matrix P of the camera 41 that captured the image 31 and camera matrix P' of the camera 42 that has taken the image 32. Further, the camera matrix P and the camera matrix P' can be represented by the following equations 4 and 5, respectively, with the location of the camera 41 as the origin.

$$P=[I|0] \qquad \text{(Equation 4)}$$

$$P'[R|t] \qquad \text{(Equation 5)}$$

In the above equation 4, "I" is a rotation matrix of the camera 41. As shown in FIG. 11, since the location of the camera 41 is the origin, I=(1,1,1). Further, in the above equation 12, "R" is a rotation matrix of the camera 42 ($R=(R_x, R_y, R_z)$). As described above, "t" is a parallel traveling matrix and corresponds to three-dimensional coordinates of the location of the camera 42 ($t=(t_x, t_y, t_z)$).

Therefore, in this case, "R" and "t" can be calculated by back-calculating from the camera matrix P and the camera matrix P'.

Specifically, the point cloud data generation unit 24 calculates "R" and "t" by solving the equations shown in the following equations 6 to 8 using the coordinates of each feature point. In Equations 6 to 8, the m hat is the coordinates on the image A obtained by normalizing m (m1 to m5). Similarly, the m' hat is the coordinates on the image B obtained by normalizing m'(m'1 to m'5). "E" is Essential matrix and "K" is camera calibration matrix.

$$E = [t]_M R = R[RTt]_M \qquad \text{(Equation 6)}$$

$$\hat{m}'^T E \hat{m} = 0 \qquad \text{(Equation 7)}$$

$$\widehat{m}_i = K^{-1} \begin{bmatrix} x \\ y \\ 1 \end{bmatrix} \qquad \text{(Equation 8)}$$

Further, the calibration matrix K can be obtained from the following equations 9 and 10. Note that $o_x$ and $o_y$ are center coordinates of the camera.

$$K = \begin{bmatrix} f_x & 0 & o_x \\ 0 & f_y & o_y \\ 0 & 0 & 1 \end{bmatrix} \qquad \text{(Equation 9)}$$

(Equation 10)

$fx, fy$: Focal length (in pixels) =

$$\frac{\text{Number of pixels on the longer side} \times \text{Focal length(mm)}}{\text{Longer sensor size(mm)}}$$

Next, the point cloud data generation unit 24 calculates the three-dimensional coordinates M (M1 to M5) of the extracted feature points by using the three-dimensional coordinates of the locations of each camera and the rotation matrix. Specifically, the point cloud data generation unit 24 calculates the three-dimensional coordinates M by solving the above equation 2 shown in the first example embodiment. In this case, X is read as M. The matrix A in Equation 2 is represented by Equation 3 also in this case.

Next, as shown in FIG. 12, the point cloud data generation unit 24 newly selects one image 33 from the images other than the initial pair image and sets the newly selected image 33 and one of the initial pair image as new pair image. The image 33 is taken by the camera 43.

Then, the point cloud data generation unit 24 specifies the feature points ($m''_1$ to $m''_3$) of the image 33 corresponding to the feature points of the image 32 and sets the feature points of the image 32 and the feature points of the image 33. as a pair feature point. Then, the point cloud data generation unit 24 calculates a camera matrix Pn of the camera 43 that has taken the image 33. The camera matrix Pn can be represented by the following equation 11.

$$Pn=[Rn|tn] \qquad \text{(Equation 11)}$$

Specifically, the point cloud data generation unit 24 calculates "Rn" and "tn" of the camera matrix Pn of the camera 43 by solving the equation shown in the following equation 12 using the specified feature points of the image 33.

$$M_i=t+diR\hat{m}_i \qquad \text{(Equation 12)}$$

In equation 12, "$M_i$" is the three-dimensional coordinates of the feature points in common with the image 32 in the newly selected image 33. "$m_i$ hat" is the normalized coordinates of the feature points in the newly selected image 33. "di" indicates the distance between the camera 43 that captured the image 53 and "mi hat", as shown in the following number 13.

$$di=\|t-\hat{m}i\| \qquad \text{(Equation 13)}$$

Next, the point cloud data generation unit 24 calculates the three-dimensional coordinates $M_i$ of the specified feature points ($m''_1$ to $m''_3$) of the image 33 by using the calculated "Rn" and "tn" of the camera matrix Pn of the camera 43. Specifically, the point cloud data generation unit 24 calculates the three-dimensional coordinates M ($M_1$ to $M_3$) of the feature points by solving the above equation 2. According to the above processing, the point cloud data generation unit 24 can generate the point cloud data of the object.

Effect in Second Example Embodiment

As described above, also in the second example embodiment, the three-dimensional coordinates of the specific portion are calculated from the plurality of images showing the designated specific portion, and the calculated three-dimensional coordinates are displayed on the three-dimensional model of the objects. Therefore, when the object is a structure and the location where the defect has occurred is designated, the manager of the structure can easily grasp the location where the defect has occurred, on the three-dimensional model of the structure.

[Program]

It suffices for the program in the first example embodiment to be a program that causes a computer to execute steps B1 to B6 illustrated in FIG. 9. By installing this program on a computer and executing the program, the coordinate calculation apparatus and the coordinate calculation apparatus method in the second example embodiment can be realized. In this case, the processor of the computer functions and performs processing as the feature point extraction unit 21, the three-dimensional coordinate calculation unit 22, the three-dimensional model display unit 23 and the point cloud data generation unit 24.

Also, the program in the present example embodiment may be executed by a computer system formed from a plurality of computers. In this case, the computers may each function as one of the feature point extraction unit 21, the three-dimensional coordinate calculation unit 22, the three-dimensional model display unit 23 and the point cloud data generation unit 24, for example.

Application Example

Figure 13:
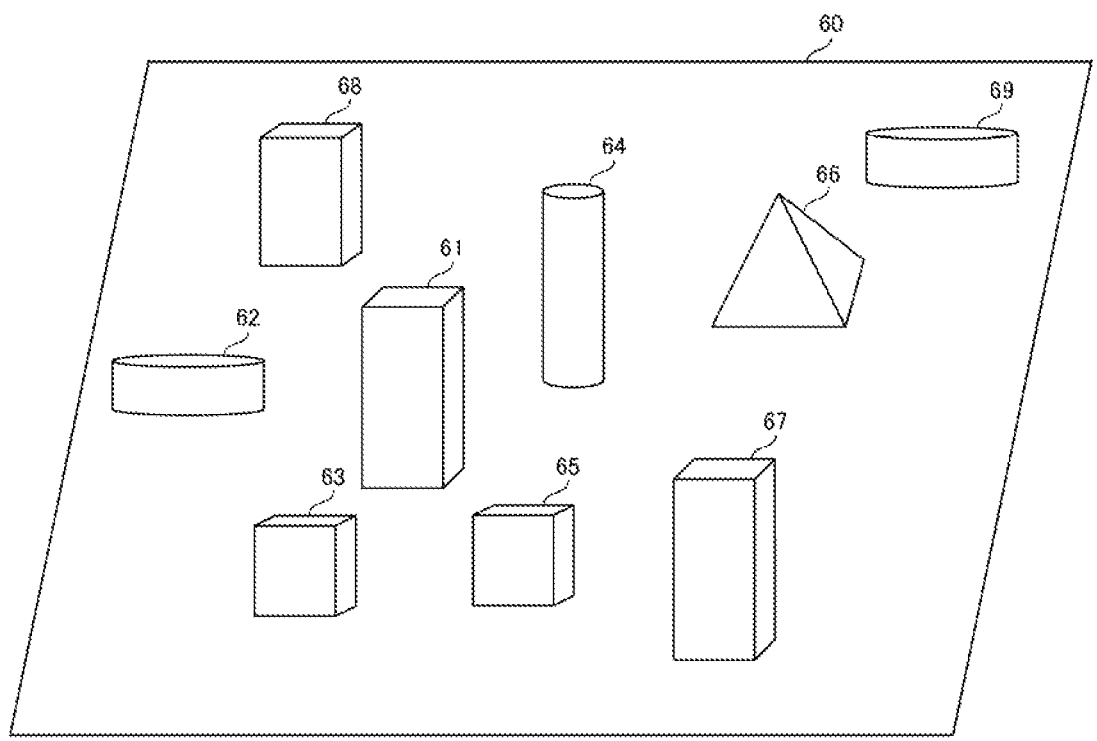
FIG. 13 is a diagram illustrating an example of a three-dimensional model of a feature existing in a specific area.
Figure 14:
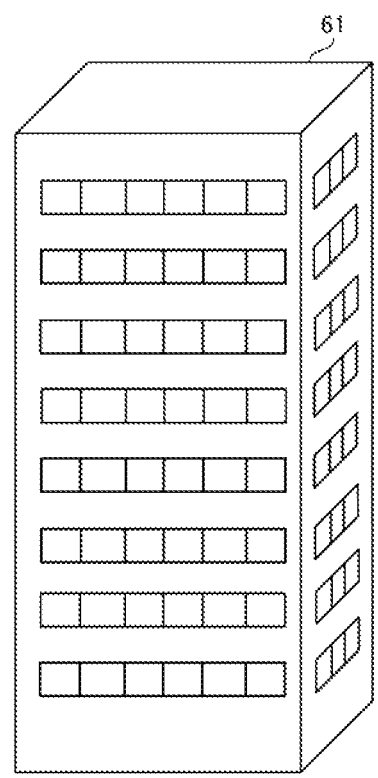
FIG. 14 is a diagram illustrating an example of one detailed three-dimensional model of the feature shown in FIG.

Next, application examples of the above-described first and second example embodiments will be described with reference to FIGS. 13 and 14. FIG. 13 is a diagram illustrating an example of a three-dimensional model of a feature existing in a specific region. FIG. 14 is a diagram illustrating an example of one detailed three-dimensional model of the feature shown in FIG. 13. This application example explains that an example in which the three-dimensional model shown in FIG. 13 is combined with the three-dimensional model shown in FIG. 14.

As shown in FIG. 13, three-dimensional models (hereinafter referred to as "wide-range three-dimensional models") of a large number of features 61 to 69 existing in the area 60 are constructed. Further, this wide-range three-dimensional model is constructed by generating point cloud data from a large number of images including the entire region 60.

As shown in FIG. 14, among the features 61 to 69 shown in FIG. 13, regarding the feature 61, the three-dimensional model is constructed more detailed than the three-dimensional model shown in FIG. 13 (hereinafter, "Detail three-Dimensional model"). The detailed three-dimensional model of the feature 61 shown in FIG. 14 is constructed by generating point cloud data from a large number of images of only the feature 61.

When the three-dimensional model shown in FIG. 13 and the three-dimensional model shown in FIG. 14 exist, the latter can be combined with the former by the coordinate calculation apparatuses according to the above-described first and second example embodiments. This will be described in detail below.

First, as shown in FIG. 13, the coordinate calculation apparatus selects a pair image showing the feature 61 from a large number of images used for generating the wide-range three-dimensional model. Next, the coordinate calculation apparatus extracts pair feature point of 3 or more and n or less features 61 from the selected pair image. "n" is a natural number of 3 or more.

In the example of FIG. 13, three pair feature points $(x_{10}, y_{10})$ $(x'_{10}, y'_{10})$, $(x_{11}, y_{11})$ $(x'_{11}, y'_{11})$, and $(x_{12}, y_{12})$ $(x'_{12}, y'_{12})$ are extracted. Then, the coordinate calculation apparatus calculates the three-dimensional coordinates $X_{10}$, $X_{11}$, and $X_{12}$ of each feature point on the feature 61 by using the extracted pair feature points.

Next, as shown in FIG. 14, the coordinate calculation apparatus selects a pair image including the same points as the feature points extracted in FIG. 13 from a large number of images used for generating the detailed three-dimensional model of the feature 61. Next, the coordinate calculation apparatus extracts, from the selected pair image, the same points as the feature points extracted in FIG. 13 as a pair of corresponding points.

In the example of FIG. 14, three pair of corresponding points $(x_{20}, y_{20})$ $(x'_{20}, y'_{20})$, $(x_{21}, y_{21})$ $(x'_{21}, y'_{21})$, and $(x_{22}, y_{22})$ $(x'_{22}, y'_{22})$ are extracted. Then, the coordinate calculation apparatus calculates the three-dimensional coordinates $X_{20}$, $X_{21}$, and $X_{22}$ of each corresponding point on the feature 61 by using the extracted pair of corresponding points.

Next, the coordinate calculation apparatus solves the simultaneous equations shown in Equation 14 and calculates a rotation matrix R and parallel matrix t which satisfy the three-dimensional coordinates calculated from the wide-range three-dimensional model and the three-dimensional coordinates calculated from the detailed three-dimensional model.

$$X_{10}=RX_{20}+t$$

$$X_{11}=RX_{21}+t$$

$$X_{12}=RX_{22}+t \quad \text{(Equation 14)}$$

After that, the coordinate calculation apparatus converts the coordinate system of the point cloud data that is the basis of the detailed three-dimensional model to the coordinate system of the point cloud data that is the basis of the wide-range three-dimensional model, by using the calculated rotation matrix R and the parallel matrix t. This makes it possible to combine a detailed three-dimensional model with a wide three-dimensional model.

Physical Configuration

Figure 15:
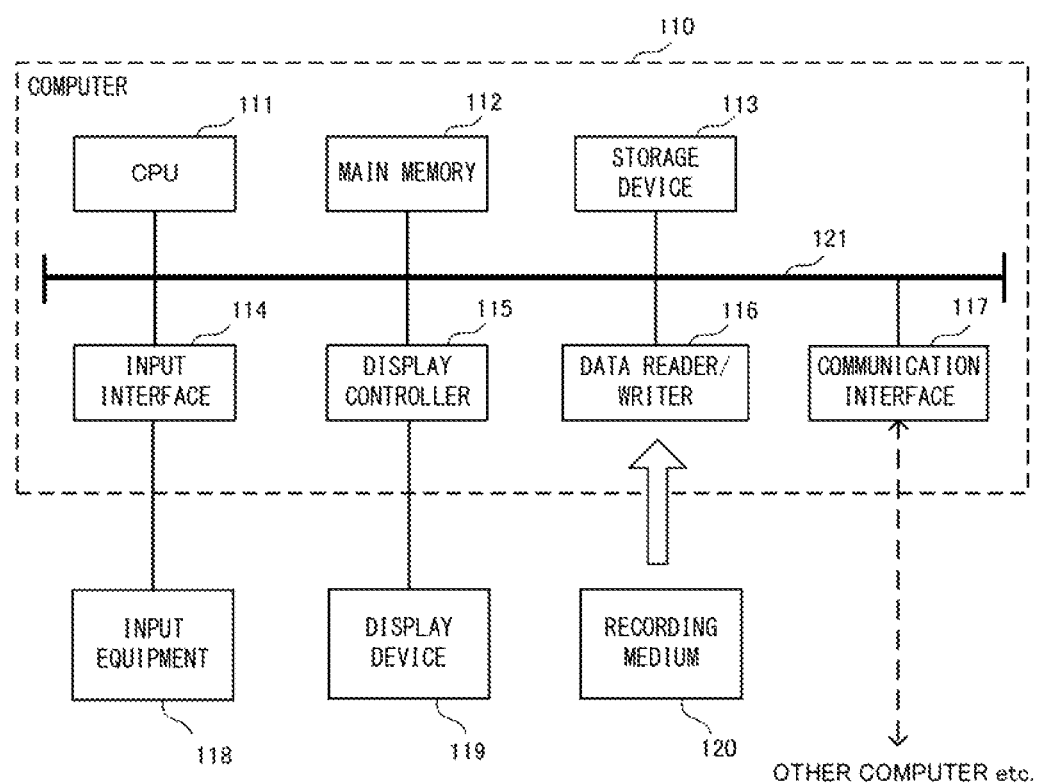
FIG. 15 is a block diagram illustrating one example of a computer realizing the coordinate calculation apparatus in the first and second embodiment of the invention.

Here, a computer that realizes the coordinate calculation apparatus by executing the program in the first and second example embodiment will be described with reference to FIG. 15. FIG. 15 is a block diagram illustrating one example of a computer realizing the coordinate calculation apparatus in the first and second embodiment of the invention.

As illustrated in FIG. 15, a computer 110 includes a central processing unit (CPU) 111, a main memory 112, a storage device 113, an input interface 114, a display controller 115, a data reader/writer 116, and a communication interface 117. These components are connected via a bus 121 so as to be capable of performing data communication with one another. Note that the computer 110 may include a graphics processing unit (GPU) or a field-programmable gate array (FPGA) in addition to the CPU 111 or in place of the CPU 111.

The CPU 111 loads the program (codes) in the present example embodiment, which is stored in the storage device 113, onto the main memory 112, and performs various computations by executing these codes in a predetermined order. The main memory 112 is typically a volatile storage device such as a dynamic random-access memory (DRAM) or the like. Furthermore, the program in the present example embodiment is provided in a state such that the program is stored in a computer readable recording medium 120. Note that the program in the present example embodiment may also be a program that is distributed on the Internet, to which the computer 110 is connected via the communication interface 117.

In addition, specific examples of the storage device 113 include semiconductor storage devices such as a flash memory, in addition to hard disk drives. The input interface 114 mediates data transmission between the CPU 111 and input equipment 118 such as a keyboard and a mouse. The display controller 115 is connected to a display device 119, and controls the display performed by the display device 119.

The data reader/writer 116 mediates data transmission between the CPU 111 and the recording medium 120 and executes the reading of the program from the recording medium 120 and the writing of results of processing in the computer 110 to the recording medium 120. The communication interface 117 mediates data transmission between the CPU 111 and other computers.

Furthermore, specific examples of the recording medium 120 include a general-purpose semiconductor storage device such as a CompactFlash (registered trademark, CF) card or a Secure Digital (SD) card, a magnetic recording medium such as a flexible disk, and an optical recording medium such as a compact disk read-only memory (CD-ROM).

Note that the coordinate calculation apparatus in the present example embodiment can also be realized by using pieces of hardware corresponding to the respective units, rather than using a computer on which the program is installed. Furthermore, a part of the coordinate calculation apparatus may be realized by using a program and the remaining part of the coordinate calculation apparatus may be realized by using hardware.

While a part of or the entirety of the above-described example embodiment can be expressed by (Supplementary note 1) to (Supplementary note 12) described in the following, the invention is not limited to the following description.

(Supplementary Note 1)

A coordinate calculation apparatus including:

an image selection unit configured to select, when a specific portion is designated in an object, two or more images including the specific portion from the images of the object, a three-dimensional coordinate calculation unit configured to specify, for each of the selected images, a location of points corresponding to each other at the specific portion, and calculating a three-dimensional coordinate of the specific portion by using the location of the point specified for each of the images and the camera matrix calculated in advance for each of the images, a three-dimensional model display unit configured to display, using the point cloud data of the object, a three-dimensional model of the object on a screen, and displaying the designated specific portion on the three-dimensional model based on the calculated three-dimensional coordinates.

(Supplementary Note 2)

The coordinate calculation apparatus according to Supplementary note 1, wherein:

the point cloud data is constructed by extracting feature points from each of a plurality of images of the object and using each of the extracted feature points.

(Supplementary Note 3)

A coordinate calculation apparatus including:

a feature point extraction unit configured to extract, when a specific portion is designated in an object, a feature point included in two or more images and related to the designated specific portion from a plurality of images including the object, a three-dimensional coordinate calculation unit configured to obtain, the three-dimensional coordinates of the extracted feature points by using a point cloud data of the object constructed by using the plurality of images, setting the obtained three-dimensional coordinates as the three-dimensional coordinates of the designated specific portion, a three-dimensional model display unit configured to display, using the point cloud data of the object, a three-dimensional model of the object on a screen, and displaying the designated specific portion the three-dimensional model based on the calculated three-dimensional coordinates.

(Supplementary Note 4)

The coordinate calculation apparatus according to Supplementary note 3, further including:

a point cloud data generation means for generating a point cloud data of the object, in case that, in each of a plurality of images including an object, feature points to corresponding to images are extracted, the point cloud data generation means selects a pair image from the images which the feature points are extracted, the point cloud data generation means, in each of the selected pair images, obtains the three-dimensional coordinates of the location of a camera that has taken the image and the rotation matrix from the camera matrix calculated in advance for the camera that has taken the image, the point cloud data generation means calculates the three-dimensional coordinates of the feature points corresponding to both of the selected pair images by using the three-dimensional coordinates of the camera location and the rotation matrix, the point cloud data generation means generates a point cloud data by using the feature points for which the three-dimensional coordinates are calculated.

(Supplementary Note 5)

A coordinate calculation method including:

(a) a step of selecting, when a specific portion is designated in an object, two or more images including the specific portion from the images of the object, (b) a step of specifying, for each of the selected images, a location of points corresponding to each other at the specific portion, and calculating a three-dimensional coordinate of the specific portion by using the location of the point specified for each of the images and the camera matrix calculated in advance for each of the images, (c) a step of displaying, using the point cloud data of the object, a three-dimensional model of the object on a screen, and displaying the designated specific portion on the three-dimensional model based on the calculated three-dimensional coordinates.

(Supplementary Note 6)

The coordinate calculation method according to Supplementary note 5 wherein:

the point cloud data is constructed by extracting feature points from each of a plurality of images of the object and using each of the extracted feature points.

(Supplementary Note 7)

A coordinate calculation method including:

(a) a step of extracting, when a specific portion is designated in an object, a feature point included in two or more images and related to the designated specific portion from a plurality of images including the object, (b) a step of obtaining, the three-dimensional coordinates of the extracted feature points by using a point cloud data of the object constructed by using the plurality of images, setting the obtained three-dimensional coordinates as the three-dimensional coordinates of the designated specific portion, (c) a step of displaying, using the point cloud data of the object, a three-dimensional model of the object on a screen, and displaying the designated specific portion the three-dimensional model based on the calculated three-dimensional coordinates.

(Supplementary Note 8)

The coordinate calculation method according to Supplementary note 7, further including:

(d) a step of generating a point cloud data of the object, in the step (d), in case that, in each of a plurality of images including an object, feature points to corresponding to images are extracted, a pair image is selected from the images which the feature points are extracted, in each of the selected pair images, the three-dimensional coordinates of the location of the camera that has taken the image and the rotation matrix are obtained from the camera matrix calculated in advance for the camera that has taken the image, the three-dimensional coordinates of the feature points corresponding to both of the selected pair images are calculated by using the three-dimensional coordinates of the camera location and the rotation matrix, a point cloud data is generated by using the feature points for which the three-dimensional coordinates are calculated.

(Supplementary Note 9)

A computer readable recording medium that includes recorded thereon a program, the program including instructions that cause a computer to carry out:

(a) a step of selecting, when a specific portion is designated in an object, two or more images including the specific portion from the images of the object, (b) a step of specifying, for each of the selected images, a location of points corresponding to each other at the specific portion, and calculating a three-dimensional coordinate of the specific portion by using the location of the point specified for each of the images and the camera matrix calculated in advance for each of the images, (c) a step of displaying, using the point cloud data of the object, a three-dimensional model of the object on a screen, and displaying the designated specific portion on the three-dimensional model based on the calculated three-dimensional coordinates.

(Supplementary Note 10)

The computer-readable recording medium according to Supplementary note 9 wherein:

the point cloud data is constructed by extracting feature points from each of a plurality of images of the object and using each of the extracted feature points.

(Supplementary Note 11)

A computer readable recording medium that includes recorded thereon a program, the program including instructions that cause a computer to carry out:

(a) a step of extracting, when a specific portion is designated in an object, a feature point included in two or more images and related to the designated specific portion from a plurality of images including the object, (b) a step of obtaining, the three-dimensional coordinates of the extracted feature points by using a point cloud data of the object constructed by using the plurality of images, setting the obtained three-dimensional coordinates as the three-dimensional coordinates of the designated specific portion, (c) a step of displaying, using the point cloud data of the object, a three-dimensional model of the object on a screen, and displaying the designated specific portion the three-dimensional model based on the calculated three-dimensional coordinates.

(Supplementary Note 12)

The computer-readable recording medium according to Supplementary note 12, further including:

(d) a step of generating a point cloud data of the object, in the step (d), in case that, in each of a plurality of images including an object, feature points to corresponding to images are extracted, a pair image is selected from the images which the feature points are extracted, in each of the selected pair images, the three-dimensional coordinates of the location of the camera that has taken the image and the rotation matrix are obtained from the camera matrix calculated in advance for the camera that has taken the image, the three-dimensional coordinates of the feature points corresponding to both of the selected pair images are calculated by using the three-dimensional coordinates of the camera location and the rotation matrix, a point cloud data is generated by using the feature points for which the three-dimensional coordinates are calculated.

The invention has been described with reference to an example embodiment above, but the invention is not limited to the above-described example embodiment. Within the scope of the invention, various changes that could be understood by a person skilled in the art could be applied to the configurations and details of the invention.

This application is based upon and claims the benefit of priority from Japanese application No. 2018-224015 filed on Nov. 29, 2018, the disclosure of which is incorporated herein in its entirety by reference.

INDUSTRIAL APPLICABILITY

As described above, according to the present invention, the location of the defective portion or the like on the three-dimensional model can be specified from the two-dimensional image showing the defective portion or the like. The present invention can be used for maintenance and management of structures, search in a specific area, and the like.

REFERENCE SIGNS LIST

10 Coordinate calculation apparatus (Embodiment 1)
11 Image selection unit
12 Three-dimensional coordinate calculation unit
20 Coordinate calculation apparatus (Embodiment 2)
21 Feature point extraction unit
22 Three-dimensional coordinate calculation unit
23 Three-dimensional model display unit
24 Point cloud data generation unit
31, 32, 33 Images
41, 42, 43 Cameras
50 Objects
60 Areas
61-69 Features
110 Computer
111 CPU
112 Main memory
113 Storage device
114 Input interface
115 Display controller
116 Data reader/writer
117 Communication interface
118 Input equipment
119 Display device
120 Recording medium
121 Bus

What is claimed is:

1. A coordinate calculation apparatus comprising:
an image selection means for selecting, when a specific portion is designated in an object, two or more images including the specific portion from the images of the object,
a three-dimensional coordinate calculation unit configured to specify, for each of the selected images, a location of points corresponding to each other at the specific portion, and calculating a three-dimensional coordinate of the specific portion by using the location of the point specified for each of the images and the camera matrix calculated in advance for each of the images,
a three-dimensional model display unit configured to display, using the point cloud data of the object, a three-dimensional model of the object on a screen, and displaying the designated specific portion on the three-dimensional model based on the calculated three-dimensional coordinates.

2. The coordinate calculation apparatus according to claim 1, wherein:
the point cloud data is constructed by extracting feature points from each of a plurality of images of the object and using each of the extracted feature points.

3. A coordinate calculation apparatus comprising:
a feature point extraction unit configured to extract, when a specific portion is designated in an object, a feature point included in two or more images and related to the designated specific portion from a plurality of images including the object,
a three-dimensional coordinate calculation unit configured to obtain, the three-dimensional coordinates of the extracted feature points by using a point cloud data of the object constructed by using the plurality of images, setting the obtained three-dimensional coordinates as the three-dimensional coordinates of the designated specific portion,
a three-dimensional model display unit configured to display, using the point cloud data of the object, a three-dimensional model of the object on a screen, and displaying the designated specific portion the three-dimensional model based on the calculated three-dimensional coordinates.

4. The coordinate calculation apparatus according to claim 3, further comprising
a point cloud data generation unit configured to generate a point cloud data of the object,
in case that, in each of a plurality of images including an object, feature points to corresponding to images are extracted, the point cloud data generation means selects a pair image from the images which the feature points are extracted,
the point cloud data generation means, in each of the selected pair images, obtains the three-dimensional coordinates of the location of a camera that has taken the image and the rotation matrix from the camera matrix calculated in advance for the camera that has taken the image,
the point cloud data generation unit calculates the three-dimensional coordinates of the feature points corresponding to both of the selected pair images by using the three-dimensional coordinates of the camera location and the rotation matrix,
the point cloud data generation unit generates a point cloud data by using the feature points for which the three-dimensional coordinates are calculated.

5. A coordinate calculation method comprising:
selecting, when a specific portion is designated in an object, two or more images including the specific portion from the images of the object,
specifying, for each of the selected images, a location of points corresponding to each other at the specific portion, and calculating a three-dimensional coordinate of the specific portion by using the location of the point specified for each of the images and the camera matrix calculated in advance for each of the images,
displaying, using the point cloud data of the object, a three-dimensional model of the object on a screen, and displaying the designated specific portion on the three-dimensional model based on the calculated three-dimensional coordinates.

6. The coordinate calculation method according to claim 5 wherein:
the point cloud data is constructed by extracting feature points from each of a plurality of images of the object and using each of the extracted feature points.

7. A coordinate calculation method comprising:
extracting, when a specific portion is designated in an object, a feature point included in two or more images and related to the designated specific portion from a plurality of images including the object,
obtaining, the three-dimensional coordinates of the extracted feature points by using a point cloud data of the object constructed by using the plurality of images, setting the obtained three-dimensional coordinates as the three-dimensional coordinates of the designated specific portion,
displaying, using the point cloud data of the object, a three-dimensional model of the object on a screen, and displaying the designated specific portion the three-dimensional model based on the calculated three-dimensional coordinates.

8. The coordinate calculation method according to claim 7, further comprising:
generating a point cloud data of the object,
in the generating, in case that, in each of a plurality of images including an object, feature points to corresponding to images are extracted, a pair image is selected from the images which the feature points are extracted,
in each of the selected pair images, the three-dimensional coordinates of the location of the camera that has taken the image and the rotation matrix are obtained from the camera matrix calculated in advance for the camera that has taken the image,
the three-dimensional coordinates of the feature points corresponding to both of the selected pair images are calculated by using the three-dimensional coordinates of the camera location and the rotation matrix,
a point cloud data is generated by using the feature points for which the three-dimensional coordinates are calculated.

9. A non-transitory computer readable recording medium that includes recorded thereon a program,
the program including instructions that cause a computer to carry out:
selecting, when a specific portion is designated in an object, two or more images including the specific portion from the images of the object, specifying, for each of the selected images, a location of points corresponding to each other at the specific portion, and calculating a three-dimensional coordinate of the specific portion by using the location of the point specified for each of the images and the camera matrix calculated in advance for each of the images, displaying, using the point cloud data of the object, a three-dimensional model of the object on a screen, and displaying the designated specific portion on the three-dimensional model based on the calculated three-dimensional coordinates.

10. The non-transitory computer-readable recording medium according to claim 9 wherein:

the point cloud data is constructed by extracting feature points from each of a plurality of images of the object and using each of the extracted feature points.

11. A non-transitory computer readable recording medium that includes recorded thereon a program, the program including instructions that cause a computer to carry out:

extracting, when a specific portion is designated in an object, a feature point included in two or more images and related to the designated specific portion from a plurality of images including the object, obtaining, the three-dimensional coordinates of the extracted feature points by using a point cloud data of the object constructed by using the plurality of images, setting the obtained three-dimensional coordinates as the three-dimensional coordinates of the designated specific portion, displaying, using the point cloud data of the object, a three-dimensional model of the object on a screen, and displaying the designated specific portion the three-dimensional model based on the calculated three-dimensional coordinates.

12. The non-transitory computer-readable recording medium according to claim 11, further comprising:

generating a point cloud data of the object, in the generating, in case that, in each of a plurality of images including an object, feature points to corresponding to images are extracted, a pair image is selected from the images which the feature points are extracted, in each of the selected pair images, the three-dimensional coordinates of the location of the camera that has taken the image and the rotation matrix are obtained from the camera matrix calculated in advance for the camera that has taken the image, the three-dimensional coordinates of the feature points corresponding to both of the selected pair images are calculated by using the three-dimensional coordinates of the camera location and the rotation matrix, a point cloud data is generated by using the feature points for which the three-dimensional coordinates are calculated.

* * * * *